(12) United States Patent
Markel et al.

(10) Patent No.: US 10,011,190 B2
(45) Date of Patent: Jul. 3, 2018

(54) ELECTRICALLY OPERATED BACKREST ADJUSTER AND VEHICLE SEAT WITH SUCH A BACKREST ADJUSTER

(71) Applicant: Johnson Controls Technology Company, Plymouth, MI (US)

(72) Inventors: Christian Markel, Alzey (DE); Thomas Christoffel, Herschweiler-Pettersheim (DE); Michael Schmidt, Lebach (DE); Norbert Heeg, Dahn (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 91 days.

(21) Appl. No.: 15/031,441

(22) PCT Filed: Oct. 17, 2014

(86) PCT No.: PCT/EP2014/072340
§ 371 (c)(1),
(2) Date: Apr. 22, 2016

(87) PCT Pub. No.: WO2015/059053
PCT Pub. Date: Apr. 30, 2015

(65) Prior Publication Data
US 2016/0257223 A1    Sep. 8, 2016

(30) Foreign Application Priority Data

Oct. 23, 2013   (DE) .................. 10 2013 221 568
Apr. 29, 2014   (DE) .................. 10 2014 208 076

(51) Int. Cl.
*B60N 2/02*       (2006.01)
*B60N 2/22*       (2006.01)
(Continued)

(52) U.S. Cl.
CPC .............. *B60N 2/0232* (2013.01); *B60N 2/22* (2013.01); *B60N 2/225* (2013.01); *B60N 2/20* (2013.01);
(Continued)

(58) Field of Classification Search
CPC .......... B60N 2/0232; B60N 2/20; B60N 2/22; B60N 2/225; B60N 2/2258; B60N 2002/0236; B60N 2002/024
See application file for complete search history.

(56) References Cited

U.S. PATENT DOCUMENTS 4,457,557 A * 7/1984  Une .................. B60N 2/20
                                              297/362
4,704,912 A * 11/1987 Payne ................ F16H 25/2021
                                              251/229
(Continued)

FOREIGN PATENT DOCUMENTS

CN   101 720 193 A   6/2010
CN   102 470 780 A   5/2012
(Continued)

OTHER PUBLICATIONS

Chinese Office Action dated Apr. 5, 2017.
Japanese Search Report dated May 30, 2017.

*Primary Examiner* — James M Ference
(74) *Attorney, Agent, or Firm* — McGlew and Tuttle, P.C.

(57) ABSTRACT

An electrically operated backrest adjuster (1, 1") for a vehicle seat (3) includes a seat part (3.1) and a backrest (3.2) which is adjustable relative to the seat part (3.1). At least one of two fitting sides—of which each includes a fitting upper part (B1) mounted on the backrest and a fitting lower part (B2) mounted on the seat part—includes a fitting (2, 2') for adjusting the inclination of the backrest (3.2). The fitting (2, 2') is arranged between the fitting upper part (B1) and the fitting lower part (B2). The fitting sides are coupled to each (Continued)

other by a transmission rod (5). An electric drive unit (6, 6') is provided on one of the fitting sides. The drive unit is arranged on the outside of the associated fitting lower part (B2) is being coupled to the transmission rod (5) for driving same.

24 Claims, 12 Drawing Sheets

(51) Int. Cl.
    *B60N 2/225*      (2006.01)
    *B60N 2/20*      (2006.01)

(52) U.S. Cl.
    CPC ...... *B60N 2/2258* (2013.01); *B60N 2002/024* (2013.01); *B60N 2002/0236* (2013.01)

(56) References Cited

U.S. PATENT DOCUMENTS

| | | | | |
|---|---|---|---|---|
| 5,308,294 A * | | 5/1994 | Wittig | B60N 2/2252 297/362 |
| 5,350,216 A * | | 9/1994 | Ito | B60N 2/0232 297/362 |
| 5,433,507 A * | | 7/1995 | Chang | B60N 2/2352 297/354.12 |
| 5,435,624 A * | | 7/1995 | Bray | B60N 2/0232 297/362 |
| 5,516,198 A * | | 5/1996 | Yokoyama | B60N 2/2218 297/362 |
| 5,547,254 A * | | 8/1996 | Hoshihara | B60N 2/2352 297/367 R |
| 5,547,255 A * | | 8/1996 | Ito | B60N 2/2352 297/367 R |
| 5,558,402 A * | | 9/1996 | Yamada | B60N 2/2356 297/363 |
| 5,567,013 A * | | 10/1996 | Chang | B60N 2/123 248/916 |
| 5,586,833 A * | | 12/1996 | Vossmann | B60N 2/2252 297/361.1 |
| 5,590,931 A * | | 1/1997 | Fourrey | B60N 2/2358 297/366 |
| 5,590,932 A * | | 1/1997 | Olivieri | B60N 2/2352 297/354.12 |
| 5,611,747 A * | | 3/1997 | Bauer | B60N 2/2252 297/362 |
| 5,634,380 A * | | 6/1997 | Scholz | B60N 2/2252 297/362 |
| 5,634,689 A * | | 6/1997 | Putsch | B60N 2/2252 297/362 |
| 5,664,836 A * | | 9/1997 | Takagi | B60N 2/2356 297/367 R |
| 5,685,610 A * | | 11/1997 | Minai | B60N 2/2218 297/364 |
| 5,718,481 A * | | 2/1998 | Robinson | B60N 2/2354 297/367 R |
| 5,810,442 A * | | 9/1998 | Ito | B60N 2/2252 297/362 |
| 5,813,725 A * | | 9/1998 | Robinson | B60N 2/2352 297/362 |
| 6,109,690 A * | | 8/2000 | Wu | B60N 2/4228 297/216.13 |
| 6,113,190 A * | | 9/2000 | Negi | B60N 2/2352 297/367 R |
| 6,139,104 A * | | 10/2000 | Brewer | B60N 2/20 297/341 |
| 6,142,569 A * | | 11/2000 | Kidokoro | B60N 2/2356 297/366 |
| 6,178,838 B1 * | | 1/2001 | Schwarzbich | B60N 2/4445 192/43.1 |
| 6,179,384 B1 * | | 1/2001 | DeKraker | A47C 7/441 297/284.1 |
| 6,193,316 B1 * | | 2/2001 | Janke | B60N 2/2213 297/362 |
| 6,209,955 B1 * | | 4/2001 | Seibold | B60N 2/2352 297/216.13 |
| 6,230,867 B1 * | | 5/2001 | Schwarzbich | B60N 2/167 192/15 |
| 6,305,748 B1 * | | 10/2001 | Ohba | B60N 2/2252 297/362 |
| 6,371,557 B1 * | | 4/2002 | Holloway | B60N 2/224 192/223.1 |
| 6,402,248 B1 * | | 6/2002 | Lloyd | B60N 2/225 297/362 |
| 6,428,104 B1 * | | 8/2002 | Sakamoto | B60N 2/2231 297/362.11 |
| 6,488,134 B2 * | | 12/2002 | Becker | B60N 2/224 192/19 |
| 6,533,356 B2 * | | 3/2003 | Teufel | B60N 2/2252 297/362 |
| 6,547,303 B1 * | | 4/2003 | Anderson | B60N 2/0232 296/68 |
| 6,565,156 B1 * | | 5/2003 | Yamashita | A47C 1/026 297/354.12 |
| 6,575,278 B1 * | | 6/2003 | Schumann | B60N 2/2352 192/15 |
| 6,575,420 B2 * | | 6/2003 | Yoshida | B60N 2/14 248/349.1 |
| 6,578,921 B2 * | | 6/2003 | Koga | B60N 2/2252 297/362 |
| 6,579,203 B2 * | | 6/2003 | Wang | B60N 2/2252 297/362 |
| 6,619,743 B1 * | | 9/2003 | Scholz | B60N 2/225 297/362 |
| 6,637,821 B2 * | | 10/2003 | Lee | B60N 2/2252 297/362 |
| 6,644,744 B2 * | | 11/2003 | Seibold | B60N 2/01583 297/328 |
| 6,659,558 B2 * | | 12/2003 | Sugimoto | B60N 2/2352 297/366 |
| 6,688,190 B2 * | | 2/2004 | Angermann | B60N 2/444 297/353 |
| 6,692,397 B2 * | | 2/2004 | Wang | B60N 2/2252 297/362 |
| 6,712,430 B2 * | | 3/2004 | Ito | B60N 2/0232 297/362 |
| 6,733,076 B2 * | | 5/2004 | Grable | B60N 2/0284 297/362 |
| 6,755,470 B2 * | | 6/2004 | Iwata | B60N 2/2252 297/361.1 |
| 6,890,034 B2 * | | 5/2005 | Bonk | B60N 2/2356 297/367 R |
| 6,910,738 B2 * | | 6/2005 | Bonk | B60N 2/2356 16/325 |
| 7,025,422 B2 * | | 4/2006 | Fast | B60N 2/206 297/378.14 |
| 7,069,811 B2 * | | 7/2006 | Frohnhaus | B60N 2/2352 192/43.1 |
| 7,086,699 B1 * | | 8/2006 | Addison | B60N 2/2252 297/362 |
| 7,090,298 B2 * | | 8/2006 | Lange | B60N 2/2252 297/362 |
| 7,090,299 B2 * | | 8/2006 | Lange | B60N 2/2252 297/362 |
| 7,097,253 B2 * | | 8/2006 | Coughlin | B60N 2/206 297/367 R |
| 7,152,922 B2 * | | 12/2006 | Garland | B60N 2/01583 296/65.01 |
| 7,204,556 B2 * | | 4/2007 | Schwerdtner | B60N 2/20 297/354.1 |
| 7,243,994 B2 * | | 7/2007 | Cha | B60N 2/2252 297/362 |
| 7,246,858 B2 * | | 7/2007 | Hsu | B60N 2/2231 297/361.1 |
| 7,264,566 B2 * | | 9/2007 | Dill | B21D 39/032 297/362 |
| 7,278,689 B2 * | | 10/2007 | Guillouet | B60N 2/2252 297/362 |

(56) References Cited

U.S. PATENT DOCUMENTS

| | | | | |
|---|---|---|---|---|
| 7,284,798 B2* | 10/2007 | Sakai | B60N 2/2252 | 297/362 |
| 7,285,067 B2* | 10/2007 | Krambeck | B60N 2/2252 | 192/223.1 |
| 7,294,081 B2* | 11/2007 | Schuler | B60N 2/0232 | 475/149 |
| 7,322,654 B2* | 1/2008 | Kawashima | B60N 2/2252 | 297/362 |
| 7,354,108 B2* | 4/2008 | Matsumoto | B60N 2/2252 | 297/353 |
| 7,364,237 B2* | 4/2008 | Grable | B60N 2/20 | 297/367 R |
| 7,380,885 B2* | 6/2008 | Fischer | B60N 2/20 | 297/362 |
| 7,384,101 B2* | 6/2008 | Kawashima | B60N 2/2252 | 297/362 |
| 7,390,061 B2* | 6/2008 | Lange | B60N 2/2252 | 297/362 |
| 7,455,361 B2* | 11/2008 | Stemmer | B60N 2/2252 | 297/362 |
| 7,461,899 B2* | 12/2008 | Seibold | B60N 2/2352 | 297/362 |
| 7,490,900 B2* | 2/2009 | Szczudrawa | B60N 2/3013 | 297/284.9 |
| 7,497,519 B2* | 3/2009 | Dill | B60N 2/2252 | 297/362 |
| 7,500,719 B2* | 3/2009 | Kojima | B60N 2/0232 | 297/362 |
| 7,517,021 B2* | 4/2009 | Wahls | B60N 2/2356 | 297/367 R |
| 7,543,889 B2* | 6/2009 | Huang | B60N 2/2252 | 297/362 |
| 7,571,962 B2* | 8/2009 | Thiel | B60N 2/2252 | 297/362 |
| 7,607,737 B2* | 10/2009 | Liebich | B60N 2/2252 | 297/362 |
| 7,611,204 B2* | 11/2009 | Reed | B60N 2/06 | 192/66.1 |
| 7,648,203 B2* | 1/2010 | Voss | B60N 2/2252 | 297/362 |
| 7,648,206 B2* | 1/2010 | Wieclawski | B60N 2/12 | 297/367 R |
| 7,677,666 B2* | 3/2010 | Grable | B60N 2/2356 | 297/366 |
| 7,681,864 B2* | 3/2010 | O'Shea | F16K 31/50 | 251/266 |
| 7,726,742 B2* | 6/2010 | Keyser | B60N 2/0232 | 297/362 |
| 7,726,743 B2* | 6/2010 | Smith | B60N 2/2252 | 297/362 |
| 7,775,594 B2* | 8/2010 | Bruck | B60N 2/0232 | 297/362 |
| 7,775,598 B2* | 8/2010 | Schmitz | B60N 2/20 | 297/362 |
| 8,033,606 B2* | 10/2011 | Mitsuhashi | B60N 2/2252 | 297/362 |
| 8,052,215 B2* | 11/2011 | Ito | B60N 2/0232 | 297/354.12 |
| 8,056,981 B2* | 11/2011 | Kojima | B60N 2/0232 | 297/362.11 |
| 8,109,573 B2* | 2/2012 | Kienke | B60N 2/20 | 297/367 R |
| 8,118,367 B2* | 2/2012 | Nathan | B60N 2/206 | 297/362.11 |
| 8,128,169 B2* | 3/2012 | Narita | B60N 2/0232 | 297/362 |
| 8,240,768 B2* | 8/2012 | Kienke | B60N 2/2252 | 297/362 |
| 8,241,165 B2* | 8/2012 | Nadgouda | B60N 2/1655 | 475/177 |
| 8,286,777 B2* | 10/2012 | Kirubaharan | B60N 2/2252 | 192/223.1 |
| 8,366,197 B2* | 2/2013 | Aktas | B60N 2/2218 | 297/367 R |
| 8,388,067 B2* | 3/2013 | Hida | B60N 2/0232 | 297/362 |
| 2002/0089223 A1* | 7/2002 | Yu | B60N 2/0232 | 297/362.11 |
| 2003/0214165 A1* | 11/2003 | Finner | B60N 2/2252 | 297/326 |
| 2004/0221670 A1* | 11/2004 | Becker | B60N 2/0232 | 74/411.5 |
| 2006/0055223 A1* | 3/2006 | Thiel | B60N 2/206 | 297/378.12 |
| 2006/0273645 A1* | 12/2006 | Ferrari | B60N 2/01583 | 297/336 |
| 2006/0284471 A1* | 12/2006 | Assmann | B60N 2/225 | 297/463.1 |
| 2006/0290187 A1* | 12/2006 | Scholz | B60N 2/0232 | 297/362 |
| 2007/0029893 A1* | 2/2007 | Schuler | B60N 2/0232 | 310/239 |
| 2007/0063567 A1* | 3/2007 | Nakaya | B60N 2/0232 | 297/362.11 |
| 2007/0108824 A1* | 5/2007 | Lange | B60N 2/2252 | 297/367 R |
| 2007/0126272 A1* | 6/2007 | Deptolla | B60N 2/206 | 297/362.11 |
| 2007/0138853 A1* | 6/2007 | Ito | B60N 2/2252 | 297/362 |
| 2007/0200408 A1* | 8/2007 | Ohta | B60N 2/0232 | 297/362.11 |
| 2008/0061616 A1* | 3/2008 | Wahls | B60N 2/2252 | 297/362 |
| 2009/0066137 A1* | 3/2009 | Ishihara | B60N 2/2356 | 297/366 |
| 2009/0322137 A1 | 12/2009 | Kojima et al. | | |
| 2010/0201174 A1* | 8/2010 | Ito | B60N 2/0232 | 297/362 |
| 2011/0221249 A1* | 9/2011 | Flesch | B60N 2/0232 | 297/362 |
| 2016/0257223 A1* | 9/2016 | Markel | B60N 2/0232 | |

FOREIGN PATENT DOCUMENTS

| | | |
|---|---|---|
| CN | 102 582 476 A | 7/2012 |
| DE | 10 2010 048682 A1 | 4/2012 |
| EP | 2 196 110 A1 | 6/2010 |
| JP | 2009-082241 A | 4/2009 |
| JP | 2010-000116 A | 1/2010 |

* cited by examiner

ELECTRICALLY OPERATED BACKREST ADJUSTER AND VEHICLE SEAT WITH SUCH A BACKREST ADJUSTER

CROSS REFERENCE TO RELATED APPLICATIONS

This application is a United States National Phase Application of International Application PCT/EP2014/072340 filed Oct. 17, 2014 and claims the benefit of priority under 35 U.S.C. § 119 of German Patent Applications 10 2013 221 568.1 filed Oct. 23, 2013 and 10 2014 208 076.2 filed Apr. 29, 2014 the entire contents of which are incorporated herein by reference.

FIELD OF THE INVENTION

The invention relates to a backrest adjuster for the electrically operated adjustment of a backrest of a vehicle seat, and to a vehicle seat with such an electrically operated backrest adjuster, and to a method of installation of such a backrest adjuster.

BACKGROUND OF THE INVENTION

In the prior art, various backrest adjusters with fittings for the manual or electrically operated adjustment of a backrest of a vehicle seat are known with or without easy-entry systems which permit various comfort or use positions of the backrest or easier entry into a second row of seats of a vehicle. The fitting is actuable by an unlocking lever, which is customarily arranged on a backrest of vehicle seat, as a result of which the backrest of the vehicle seat pivots into a comfort position or out of an entry region. If the vehicle seat is arranged on rails, the vehicle seat can be additionally displaceable out of the entry region in the direction of travel when the unlocking lever is actuated.

SUMMARY OF THE INVENTION

It is an object of the present invention to provide an improved backrest adjuster with a fitting with electrically operated adjustment of a backrest, and a vehicle seat with an improved backrest adjuster. Furthermore, it is an object of the invention to provide a method for installing such a backrest adjuster.

The electrically operated backrest adjuster according to the invention for a vehicle seat with a seat part and a backrest which is adjustable relative to the seat part comprises two fitting sides of which each comprises a fitting upper part, which is fixed on the backrest, and a fitting lower part, which is fastened to a substructure or is fixed on the seat part, and of which at least one comprises a fitting for adjusting the inclination of the backrest, wherein the fitting is arranged between the fitting upper part and the fitting lower part, and the fitting sides are coupled to each other by means of a transmission rod, wherein an electric drive unit is provided on one of the fitting sides, said electric drive unit being arranged on the outside of the associated fitting lower part and being coupled to the transmission rod for driving same.

The invention permits a simply constructed electrically operated backrest adjuster which in particular has a low number of parts, wherein a multiplicity of said parts are identical parts which can be used in various vehicle seats irrespective of the underlying type of vehicle seat. This permits a particularly cost-effective electrically operated backrest adjuster. Furthermore, the electrically operated backrest adjuster can be designed as a premanufactured installation unit which is suitable for retrofitting, or installing on, vehicle seats which are already present.

In a refinement of the invention, the fitting is designed as a rotary and/or latching fitting. Various comfort or use positions of the backrest or facilitated entry into a rear region of a vehicle are therefore possible.

In a simple embodiment, the fitting lower part of the drive-side fitting side is designed in such a manner that said fitting lower part forms the housing for the electric drive unit. Alternatively, an additional housing part, in particular a housing base or housing cover for the electric drive unit, can be arranged on the fitting lower part.

In a development, an actuator, in particular an actuating element, in a particular a servo drive, is arranged on the fitting lower part of the drive-side fitting side, said actuator being operatively connected to an actuating unit, in particular to a lever element, for unlocking or locking the fitting.

Furthermore, a switching element, in particular a microswitch or a position indicator, is arranged on the fitting lower part of the drive-side fitting side, said switching element being operatively connected to the lever element in order to determine the position thereof.

In a possible embodiment, the electric drive unit comprises a motor with a driveshaft and a pinion which is arranged on the driveshaft, in particular a drive wheel, which is in engagement with a stop element, in particular an output wheel, which is connected to the fitting upper part and to the transmission rod in a rotationally fixed fashion. The pinion and the stop element may involve a gearwheel pairing or another wheel gearing, such as a planetary gearing.

Furthermore, in an embodiment, the respective fitting lower part is designed in such a manner that said fitting lower part is fastened to a component, which is fixed on the floor, of the seat part and/or to a substructure in an interlocking, nonpositive/friction and/or integrally bonded/adhesion manner. In a manner corresponding thereto, the respective fitting upper part is designed in such a manner that said fitting upper part is fastened to a frame structure of the backrest in an interlocking, nonpositive/friction and/or integrally bonded/adhesion manner. When the fitting is unlocked, the fitting upper part and the fitting lower part are moveable, in particular rotatable, relative to each other, for which purpose the fitting is designed as geared connection, in particular as tooth gearing and/or a planetary gearing.

In a preferred embodiment, the electrically operated backrest adjuster is designed as a premanufactured installation unit which comprises at least the following components:

two fitting sides, of which each comprises a fitting upper part and a fitting lower part, and of which at least one comprises a fitting for adjusting the inclination of the backrest, wherein the fitting is arranged between the fitting upper part and the fitting lower part, and the fitting sides are coupled to each other by means of a transmission rod, and wherein an electric drive unit is provided on one of the fitting sides, said electric drive unit being arranged on the outside of the associated fitting lower part and being coupled to the transmission rod for driving same.

A vehicle seat according to the invention with an inclination-adjustable and freely pivotable backrest has the above-described, electrically operated backrest adjuster which can be designed in particular as a premanufactured installation unit which is suitable for retrofitting, or installation on, vehicle seats which are already present.

The method according to the invention for the installation of an electrically operated backrest adjuster comprises at least the following steps:

fitting together the two fitting upper parts and the transmission rod connecting same, placing and fastening the at least one fitting on one of the fitting sides on an end of the transmission rod that projects out of the fitting upper part concerned, placing and arranging the fitting lower parts onto those ends of the transmission rods which project out of the fittings, placing and fastening an actuating unit on a fitting lower part on the outside of one of the fitting sides, mounting a driveshaft with a pinion on said fitting lower part, to which the actuating unit is fastened, mounting and fastening an electric drive unit on the outside of said fitting lower part concerned, in particular mounting and fastening the associated components, such as a motor, an actuator, a switching element.

The object is furthermore achieved, according to the invention by a backrest adjuster with a fitting for the electrically operated adjustment of a backrest, wherein the fitting is formed from a fitting upper part, which is arranged on the backrest, and a fitting lower part, which is fastened to a substructure. Such a fitting may be arranged here on in each case one side of a vehicle seat. The fitting is provided here for positioning a backrest of a vehicle seat into an easy-entry position, for integrated comfort locking for positioning the backrest into at least one comfort or seat position, and for an extended comfort function for positioning the backrest beyond the easy-entry position into a loading floor position. The fitting according to the invention comprises at least one fitting part and a driver which is in engagement with a comfort lever, wherein a pivoting range of the backrest in the easy-entry position is limited by means of an easy-entry pawl engaging in the at least one fitting part, wherein the driver is couplable to an unlocking lever in order to unlock the fitting and, for the positioning of the backrest beyond the easy-entry position into the loading floor position, is decouplable from the unlocking lever, wherein, in the decoupled state of the driver and unlocking lever, the latter, upon being actuated, carries along the easy-entry pawl.

Exemplary embodiments of the invention are explained in more detail below with reference to schematic figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Mutually corresponding parts are provided with the same reference signs in all of the figures.

Figure 1A:
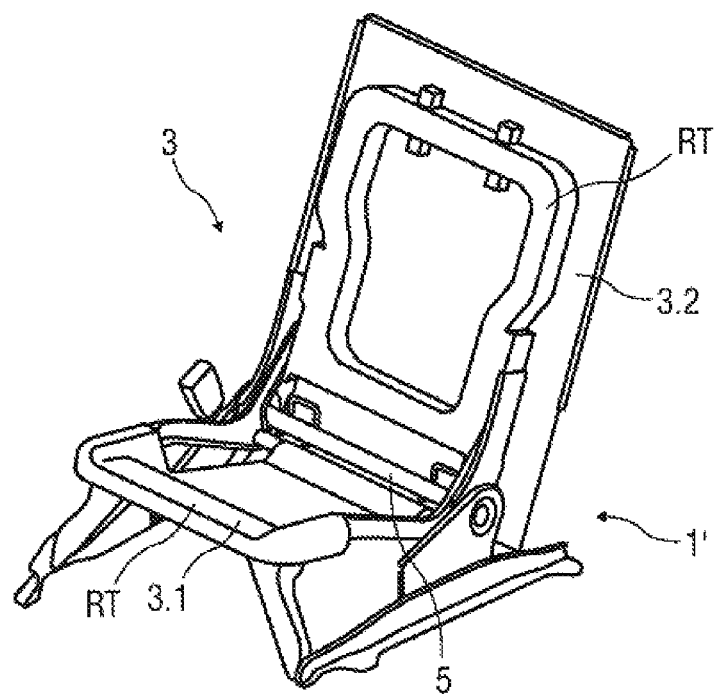
FIG. 1A is a schematic view showing a vehicle seat with a conventional manually actuable backrest adjuster.

FIG. 1A shows a conventional manually actuable backrest adjuster 1' for a vehicle seat 3 according to the prior art. FIGS. 1B to 1E present a plurality of partial views with a sequence diagram for the retrofitting and installation of an electric drive unit 6 on an electrically operated backrest adjuster 1" according to the invention.

Figure 1B:
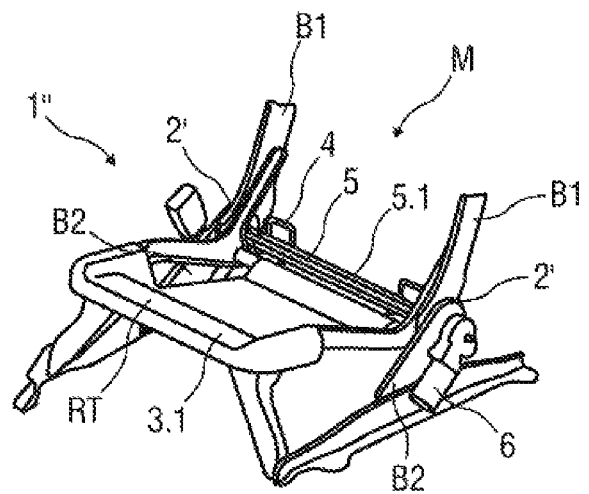
FIG. 1B is a schematic partial view showing a vehicle seat cutaway with seat part without a mounted backrest but with the mounted electrically operated backrest adjuster, as part of a sequence diagram for the retrofitting and installation of an electric drive unit.

The vehicle seat 3 comprises a seat part 3.1 and a backrest 3.2, which is arrangeable pivotably on the latter, as seat components. In FIG. 1A-1B, the seat part 3.1 and the backrest 3.2 are illustrated without upholstery and therefore the structural components thereof, in particular frame parts RT, are shown.

The electrically operated backrest adjuster 1" according to the invention according to FIGS. 1B to 1E comprise two fittings, which are designed as rotary fittings 2' on both outer sides for adjusting the inclination and for freely pivoting the backrest 3.2 relative to the seat part 3.1. The two rotary fittings 2' are coupled rotatably to each other by means of a transmission rod 5. Alternatively, only one of the outer sides or fitting side may be provided with a rotary fitting 2', and the opposite fitting side is then designed as a rotary bearing 7 (shown in FIGS. 2A to 2E).

For the electrically operated adjustment of the inclination of the backrest 3.2 relative to the seat part 3.1, the backrest adjuster 1" comprises the electric drive unit 6 which is arranged on the transmission rod 5 on the outside of one of the fitting sides of the backrest adjuster 1" and drives the latter when required.

FIG. 1A shows the vehicle seat 3 with the mounted, conventional manually actuable backrest adjuster 1' according to the prior art.

FIG. 1B shows the seat part 3.1 without a mounted backrest 3.2, but with the mounted electrically operated backrest adjuster 1".

Figure 1C:
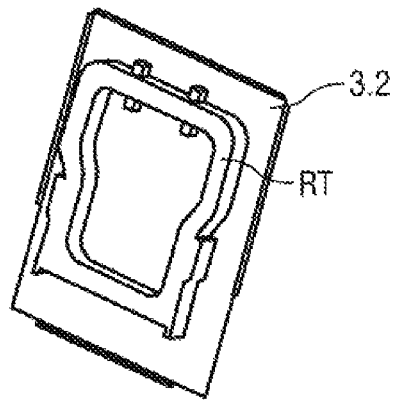
FIG. 1C is a schematic partial view showing a backrest which is to be mounted on the seat part having the already mounted electrically operated backrest adjuster, as part of a sequence diagram for the retrofitting and installation of an electric drive unit.

FIG. 1C shows the backrest 3.2 which is to be mounted on the seat part 3.1 having the already mounted electrically operated backrest adjuster 1".

The electrically operated backrest adjuster 1" can be mounted as a premanufactured installation unit M on the vehicle seat 3, in particular on the seat part 3.1, as shown in FIG. 1C. The installation unit M of the electrically operated backrest adjuster 1" comprises, on both sides of a tube 5.1 which is fixed on the backrest, a respective fitting upper part B1 and a fitting lower part B2, between which one of the rotary fittings 2' is in each case arranged, said rotary fittings being coupled to each other by means of the transmission rod 5. The tube 5.1 serves here as a casing for the transmission rod 5. On one of the fitting sides, the electric drive unit 6 is arranged on the transmission rod 5 on the outside of the fitting lower part B2 concerned.

The electric drive unit 6 is designed at least as an electric motor which directly drives the transmission rod 5.

Figure 1D:
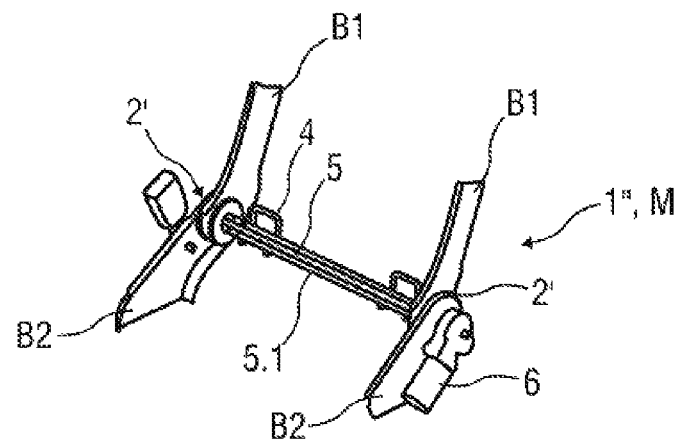
FIG. 1D is a schematic partial view showing completely mounted and premanufactured installation unit of the electrically operated backrest adjuster as part of a sequence diagram for the retrofitting and installation of an electric drive unit.

The completely mounted and premanufactured installation unit M of the electrically operated backrest adjuster 1" is shown in FIG. 1D.

Figure 1E:
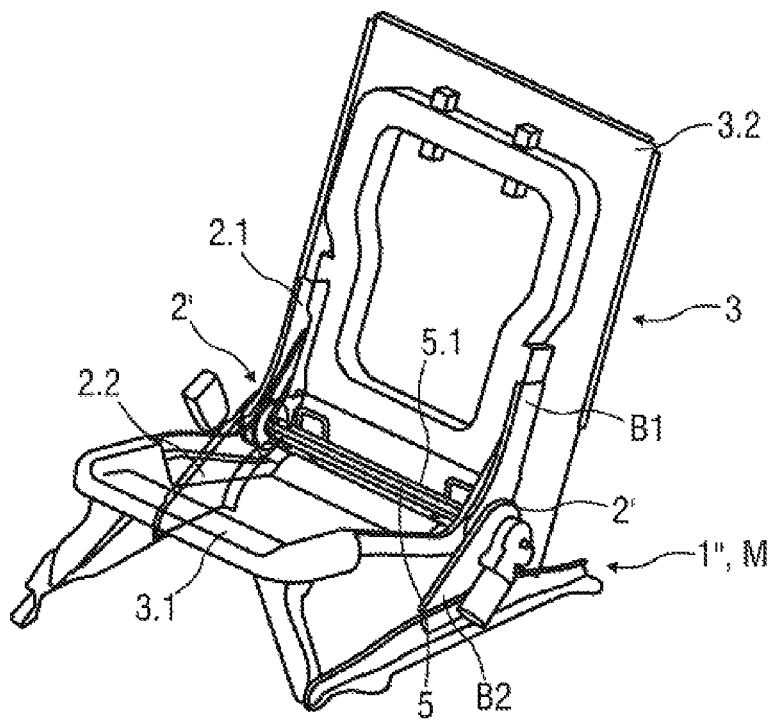
FIG. 1E is a schematic partial view showing a vehicle seat with the premanufactured installation unit of the electrically operated backrest adjuster, which installation unit is mounted on the seat part, and with a mounted backrest, as part of a sequence diagram for the retrofitting and installation of an electric drive unit.

FIG. 1E shows the vehicle seat 3 with the premanufactured installation unit M of the electrically operated backrest adjuster 1", which installation unit is mounted on the seat part 3.1, and with a mounted backrest 3.2.

As shown in the partial FIGS. 1B, 1D and 1E, the transmission rod 5 can be surrounded by a tube 5.1 which is provided with holding elements 4, in particular holders for a child seat.

By means of such a premanufactured installation unit M of the electrically operated backrest adjuster 1", retrofitting on a vehicle seat 3 which is already present is possible by simply removing the backrest 3.2 and exchanging the manually actuable backrest adjuster 1' for the installation unit M of the electrically operated backrest adjuster 1" and reinstalling the backrest 3.2 on the seat part 3.1.

Figure 2A:
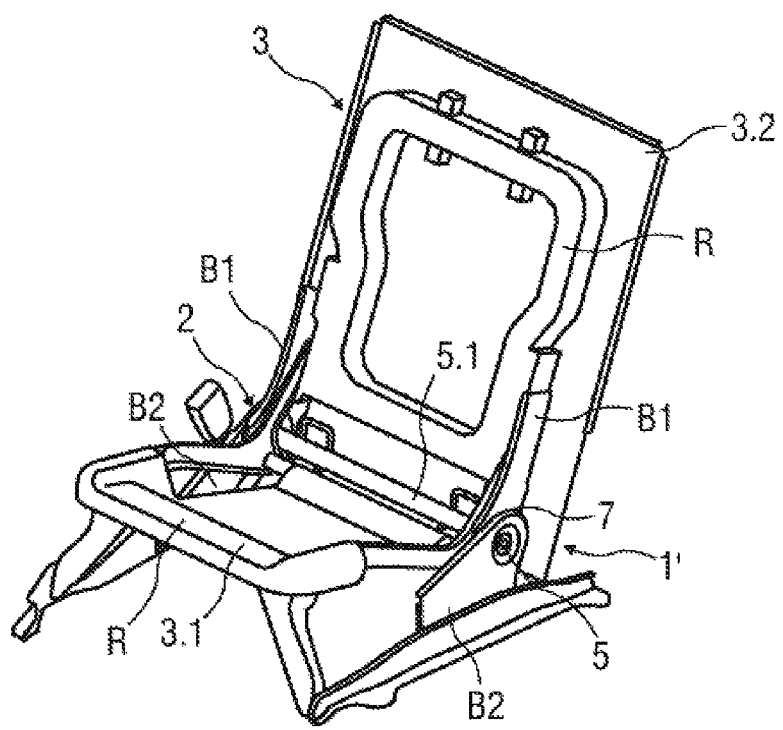
FIG. 2A is a view showing a vehicle seat with a conventional manually actuable backrest adjuster.
Figure 2B:
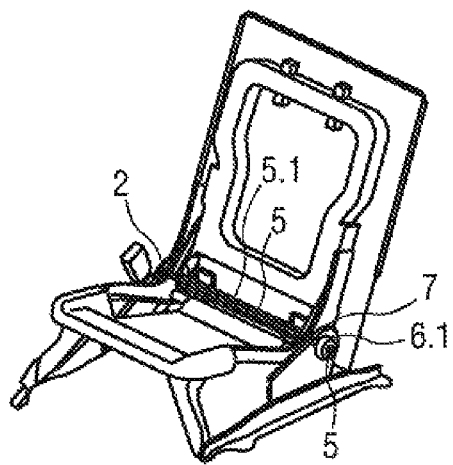
FIG. 2B is a schematic view showing an alternative exemplary embodiment installation of the actuating unit of the vehicle seat of FIG. 2A, as part of a sequence diagram for the installation of the alternative backrest adjuster on the vehicle seat.
Figure 2C:
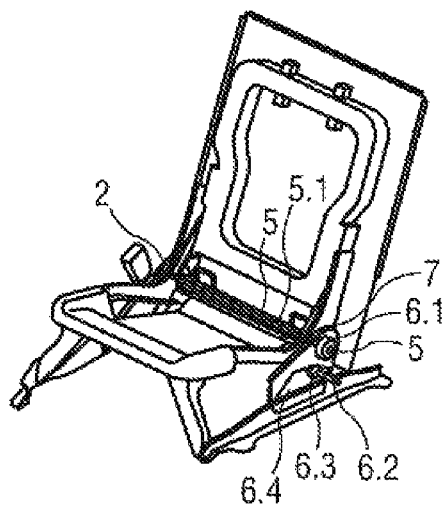
FIG. 2C is a schematic view showing further installation, as part of a sequence diagram for the installation of the alternative backrest adjuster on the vehicle seat.
Figure 2D:
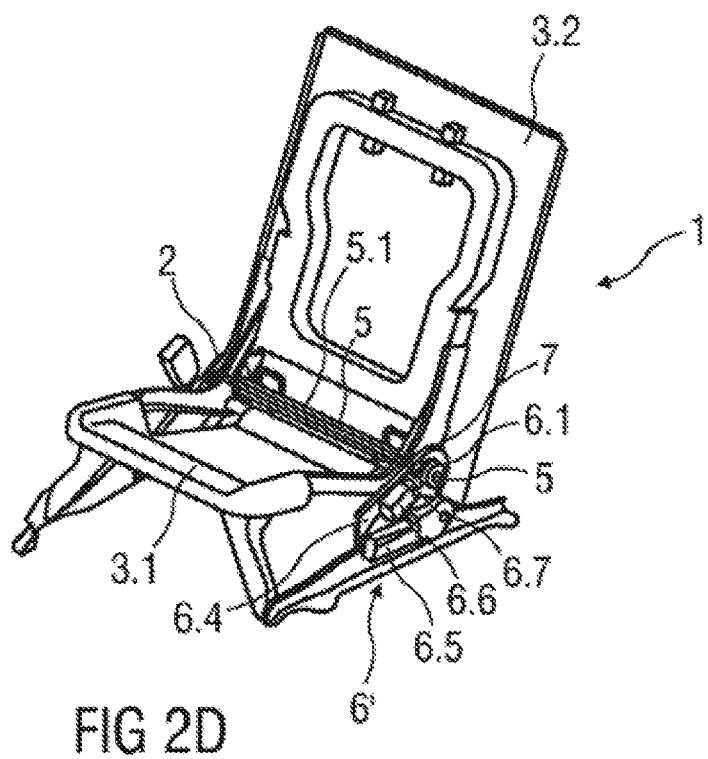
FIG. 2D is a schematic view showing further installation, as part of a sequence diagram for the installation of the alternative backrest adjuster on the vehicle seat.
Figure 2E:
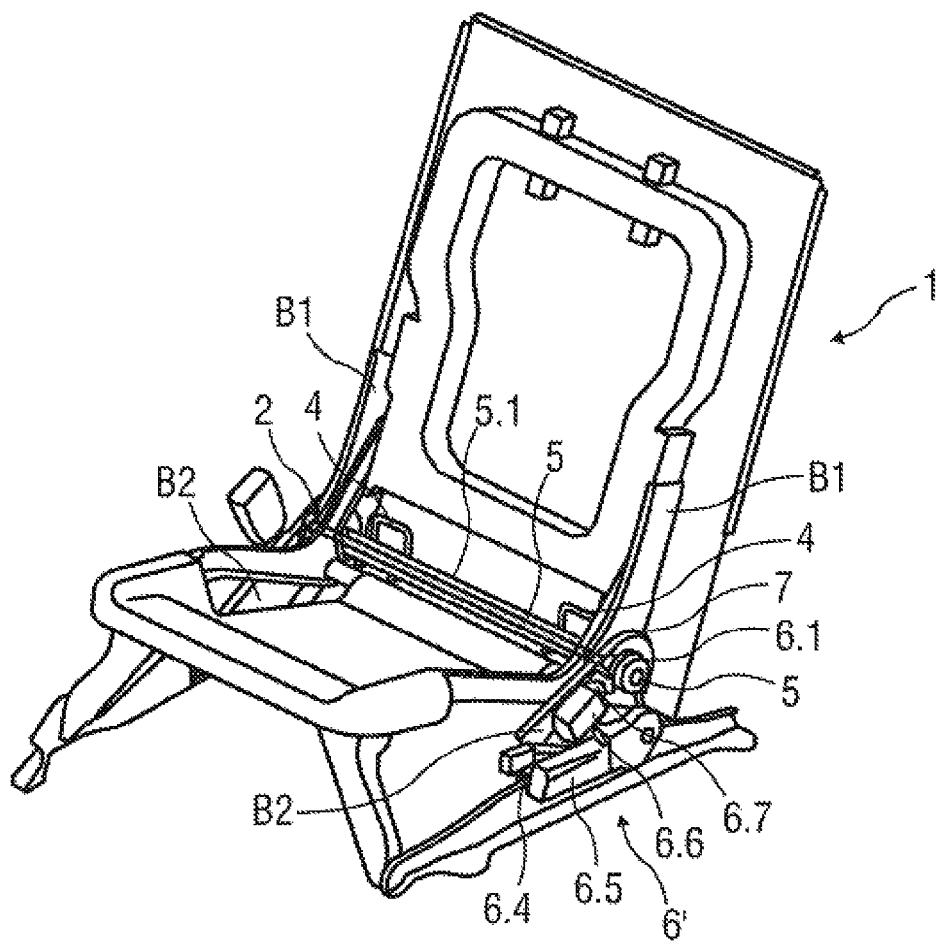
FIG. 2E is a schematic view showing further installation, as part of a sequence diagram for the installation of the alternative backrest adjuster on the vehicle seat.

FIG. 2E shows an alternative exemplary embodiment of a backrest adjuster 1 which is electrically operated on one side. The partial FIGS. 2A to 2E show a sequence diagram for the retrofitting or installation of the alternative backrest adjuster 1 with an alternative electric drive unit 6 on the vehicle seat 3.

Partial FIG. 2A shows a conventional vehicle seat 3 with the backrest adjuster 1. On one of the outer sides, the backrest adjuster 1 comprises a fitting 2, which is designed as a latching fitting, for the releasable locking of seat part 3.1 and backrest 3.2 and for the adjustment of the inclination and free-pivoting of the backrest 3.2 relative to the seat part 3.1. On the opposite side, the electrically operated backrest adjuster 1 comprises a rotary bearing 7. The rotary bearing 7 and the fitting 2 are coupled rotatably to each other by means of the transmission rod 5. On both sides of the vehicle seat 3, a respective fitting upper part B1 and fitting lower part B2 are arranged on the fitting sides.

For the electrical adjustment of the backrest 3.2, the electric drive unit 6 is arrangeable, in particular mountable or retrofittable, on the associated fitting lower part B2 on the side with the rotary bearing.

The electric drive unit 6' according to FIGS. 2B to 2E comprises an actuating unit 6.1, a drive shaft 6.2 which is arranged on the fitting lower part B2 and includes pinion 6.3, a housing part 6.4 arranged on the fitting lower part B2, in particular a cover, a motor 6.5, in particular an electric motor, an actuator 6.6 and a switching element 6.7. The electric drive unit 6' is shown in the fitted-together state with all of the components in the partial FIG. 2E.

The fitting 2, the rotary bearing 7 and the associated fitting upper parts B1 and fitting lower parts B2 and also the transmission rod 5 and the tube 5.1 surrounding the latter are already mounted on the vehicle seat 3 and are identical parts which can be used both for a manually actuable and for an electrically operated backrest adjuster 1' and 1, respectively.

For the retrofitting or installation of the electric drive unit 6' on the backrest adjuster 1, the following steps are carried out:

FIG. 2B shows the installation of the actuating unit 6.1 for actuating, in particular locking and unlocking the fitting 2 which is fastened on the outside of the fitting lower part B2, which is on the side with the rotary bearing, on the outer side of the vehicle seat 3, on which the rotary bearing 7 is arranged. The actuating unit 6.1 is designed here in such a manner that the latter upon actuation rotates the transmission rod 5 such that the fitting 2 arranged on the opposite outer side of the vehicle seat 3 is opened.

Subsequently, as illustrated in FIG. 2C, a housing part 6.4, in particular a cover for the electric drive unit 6', is arranged on the inner side of the fitting lower part B2. Furthermore, the drive shaft 6.2 including pinion 6.3 is mounted on the fitting lower part B2.

FIG. 2D shows the installation of further components of the electric drive unit 6' on the outer side of the fitting lower part B2, namely the installation of a motor 6.5, in particular an electric motor, an actuator 6.6, in particular a servo drive, a switching element 6.7, in particular a microswitch or a position indicator.

FIG. 2D shows the electrically operated backrest adjuster 1 which is completely mounted on the vehicle seat 3, together with the electric drive unit 6'.

Instead of installing the individual components of the electric drive unit 6' on the vehicle seat 3, the electric drive unit 6' may be premanufactured as an installation unit M and arranged on the vehicle seat 1.

For this purpose, for example, first of all the two fitting upper parts B1 and the transmission rod 5 connecting the latter are fitted to one another. Subsequently, the fitting 2 on one of the fitting sides is placed on an end of the transmission rod 5 that projects out of the fitting upper part B1 concerned and mounted, in particular fastened by means of latching/snap connection. In a subsequent step, the fitting lower parts B2 are placed and mounted onto those ends of the transmission rod 5 which project out of the fitting 2 or the rotary bearing 7. In a further step, an actuating unit 6.1 is placed and mounted on the fitting lower part B2 on the outside of the fitting side with the rotary bearing. Furthermore, a drive shaft 6.2 with a pinion 6.3 is mounted on said fitting lower part B2 on the side with the rotary bearing. In a further step, the electric drive unit 6' is then arranged and fastened on the outside of said fitting lower part B2 concerned, which is on the side with the rotary bearing. In particular, the associated components, such as the motor 6.5, the actuator 6.6 and the switch element 6.7 are mounted and fastened here.

Figure 3:
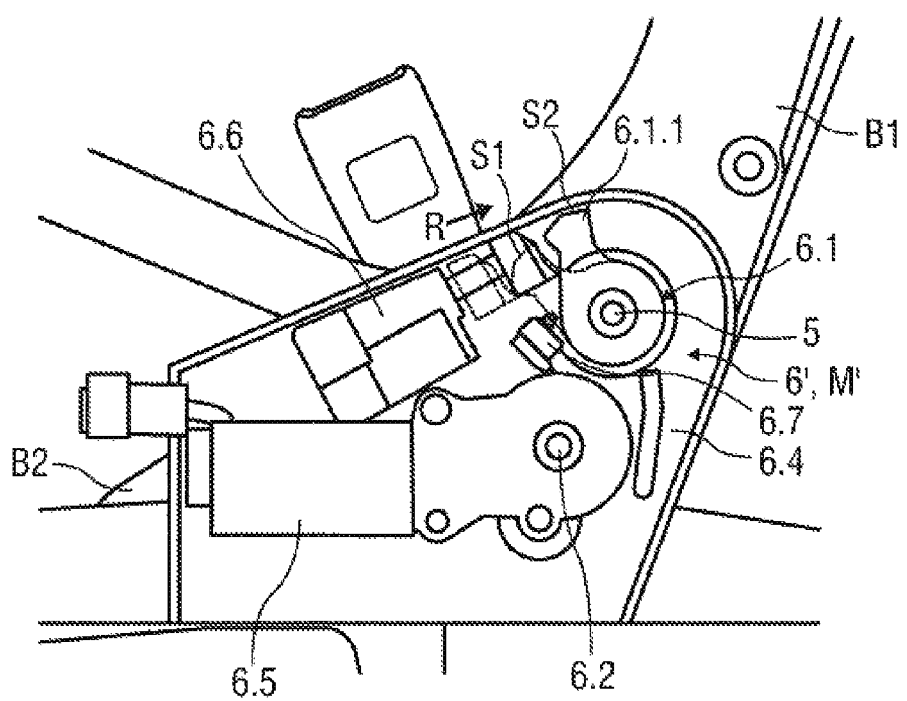
FIG. 3 is a schematic view showing an exemplary embodiment of an electric drive unit which is arranged on the outside of a fitting lower part of a backrest adjuster according to FIG. 2.

FIG. 3 schematically shows an exemplary embodiment of an electric drive unit 6' which can be mounted or retrofitted as an alternative installation unit M' on the vehicle seat 3, on the side with the rotary bearing.

For this purpose, the electric drive unit 6' comprises at least the inner housing part 6.4 which is arranged on the outside of the fitting lower part B2 of the backrest adjuster 1. An outer housing part, in particular a cover, which is arrangeable on the inner housing part 6.4 in order to protect the components of the electric drive unit 6', is not illustrated for the purpose of better clarity.

The components, such as the actuating unit 6.1, the drive shaft 6.2 including pinion 6.3, the motor 6.5, in particular an electric motor, the actuator 6.6 and the switching element 6.7, are arranged in the housing and therefore on the inner housing part 6.4.

The actuating unit 6.1 which is arranged on the transmission rod 5 in an interlocking and/or nonpositive manner, comprises a lever element 6.1.1. The lever element 6.1.1 is adjustable between a first position S1, in which the opposite fitting 2 is locked, and a second position S2, in which the fitting 2 is opened.

In order to open the fitting 2, an actuating element (not illustrated specifically), for example a button in the trunk compartment or in a vehicle door, is actuated. Resulting therefrom, the actuator 6.6 is actuated via a control device (not illustrated) and extends in the direction R such that the lever element 6.1.1 is moved from the first position S1 into the second position S2 and the fitting 2 is opened and remains open.

The actuator 6.6 moves back counter to the direction R into a retracted position.

The switching element 6.7, which is designed, for example, as a micro switch or position indicator, determines with reference to the position of the lever element 6.1.1 that the fitting 2 is opened and outputs a control signal to the motor 6.5 such that the latter is activated, and therefore the drive shaft 6.2 rotates.

Figure 4:
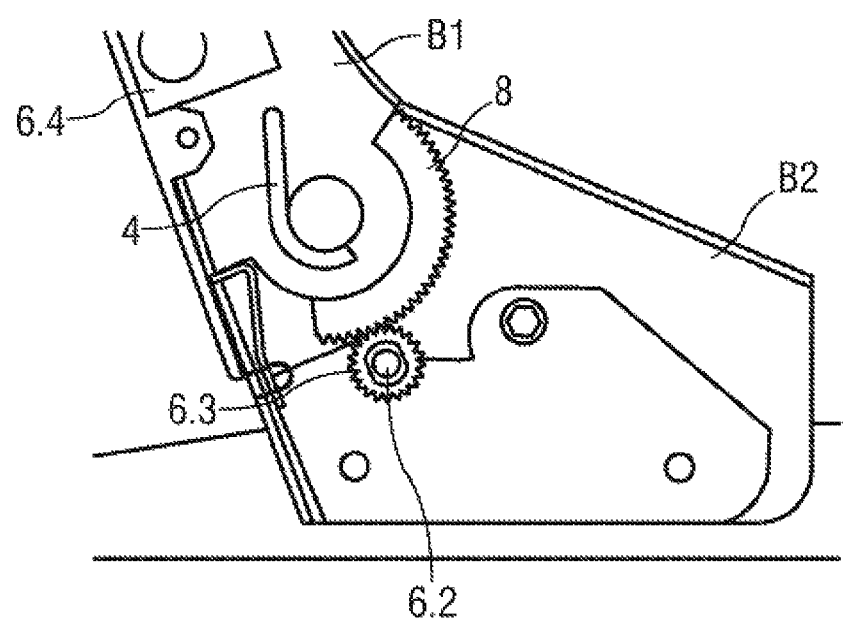
FIG. 4 is a schematic view showing the backrest adjuster according to FIG. 3 from the inside in the region of the fitting lower part.

FIG. 4 shows the components of the backrest adjuster 1 from the inside on the side with the rotary bearing. The drive shaft 6.2 which is driven by the motor 6.5 rotates the pinion 6.3 which is arranged on said drive shaft and, in turn, drives a stop element 8, which is fixed on the backrest, and therefore the backrest 3.2 is pivoted because of the opened fitting 2.

The pinion 6.3 here has an external toothing which corresponds to an external toothing of the stop element 8. The pinion 6.3 and the stop element 8 form a gearwheel pairing. Alternatively, said pinion and stop element may have another suitable geared connection and may be designed, for example, a planetary gearing.

The stop element 8 is fixedly connected, for example welded, to the fitting upper part B1.

The stop element 8 is coupled to the transmission rod 5 for rotation therewith, and therefore the rotational movement is transmitted to the transmission rod 5 and to the opposite fitting 2 until the backrest 3.2 has reached a pivoted position in which the fitting 2 is locked and further pivoting of the backrest 3.2 is stopped.

Figure 5:
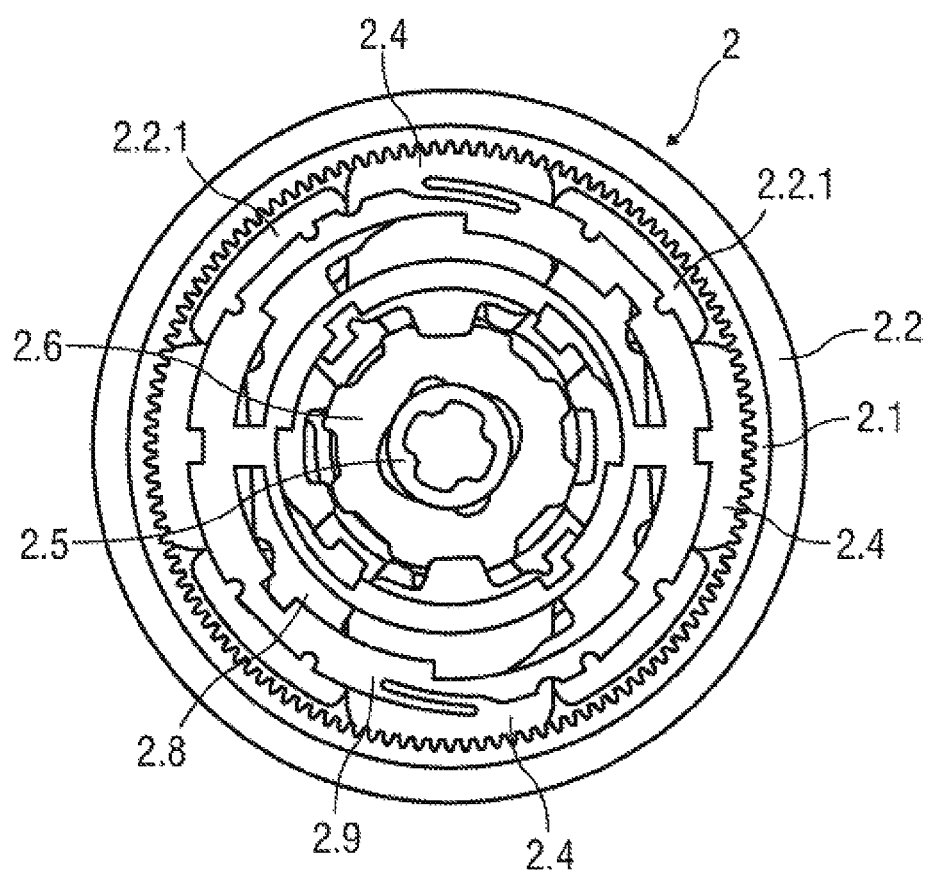
FIG. 5 is a schematic top view showing an exemplary embodiment of a fitting, which is designed as a latching fitting.

FIG. 5 schematically shows an exemplary embodiment for a fitting 2, which is designed as a latching fitting, in top view. A conventional latching fitting may be involved here.

Figure 6A:
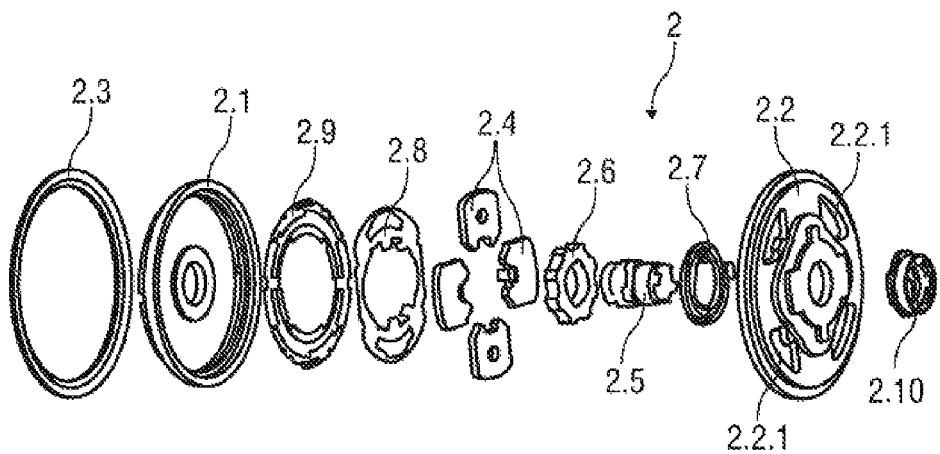
FIG. 6A is a schematic exploded illustration showing an exemplary embodiment of a fitting, which is designed as a latching fitting, of a backrest adjuster.
Figure 6B:
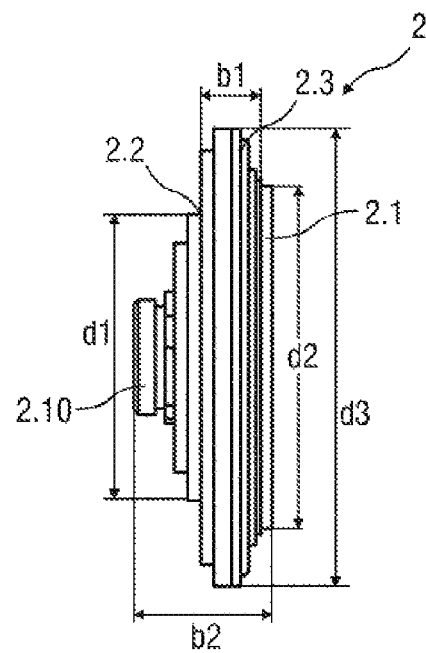
FIG. 6B is a schematic a perspective illustration showing the fitting according to FIG. 6A when fitted together.

FIGS. 6A and 6B show a possible embodiment of a fitting 2, which is designed as a latching fitting, in an exploded illustration and in a perspective illustration when fitted together, respectively.

The fitting 2 has a first fitting part 2.1, which is designed in particular as a toothed ring, and a second fitting part 2.2, which is designed in particular as a toothed ring and which is rotatable about an axis relative to the first fitting part 2.1. Furthermore, the fitting has an impingeable eccentric which is mounted rotatably about the axis, and a plurality of locks 2.4 which, guided by the second fitting part 2.2 by means of guide segments 2.2.1 in a radial direction with respect to the axis and impinged by the eccentric, are movably radially out and which, for locking of the fitting 2, interact by means of a toothing radially on the outside with the toothed ring of the first fitting part.

The first fitting part 2.1 is connected, for example, fixedly to the structure of the back rest 3.2, in particular to the fitting upper part B1, and is therefore fixed on the backrest. The second fitting part 2.2 is connected fixedly to the structure of the seat part 3.1, in particular to the fitting lower part B2, and is therefore fixed on the seat part. The assignments of the fitting parts 2.1 and 2.2 may also be interchanged, i.e. the first fitting part 2.1 is fixed on the seat part and the second fitting part 2.2 is fixed on the backrest.

In order to absorb the axially acting forces and in order to hold together the fitting parts 2.1, 2.2, a clasp ring 2.3 is provided.

A driver 2.5 is arranged in the center of the fitting 2 between the fitting parts 2.1, 2.2. An eccentric 2.6 is arranged on the driver 2.5 for rotation therewith or at least coupled thereto for carrying along purposes. A spring arrangement 2.7, in particular a spiral spring, is arranged in a central receptacle of one of the fitting parts 2.1, 2.2, in the present case of the second fitting part 2.2. In the present case, the spring arrangement 2.7 impinges the eccentric 2.6 by sitting on the inside of the driver 2.5 for rotation therewith.

The eccentric 2.6 impinged by the spring arrangement 2.7 acts on the radially movable locks 2.4 and impinges the latter such that they are pressed radially outward in order to engage in the toothed ring, and therefore the fitting 2 is locked.

A control disc 2.8 is arranged axially between the locks 2.4 and the first fitting part 2.1 in the construction space and sits here on the eccentric 2.6 for rotation therewith.

The fitting 2 optionally has an annular freely pivoting control element 2.9, for example, for setting the backrest 3.2 into a freely pivoted position which is not suitable for using the seat, and a securing element 2.10 for receiving the transmission element 5.

The components of the fitting 2 have customary dimensions here, in particular diameters d1 to d3 of, for example, 50 mm to 80 mm, and widths b1 to b2 (depth of the fitting 2) of approximately 8, in particular 10 mm to approximately 30 mm, in particular 25 mm.

Figure 7:
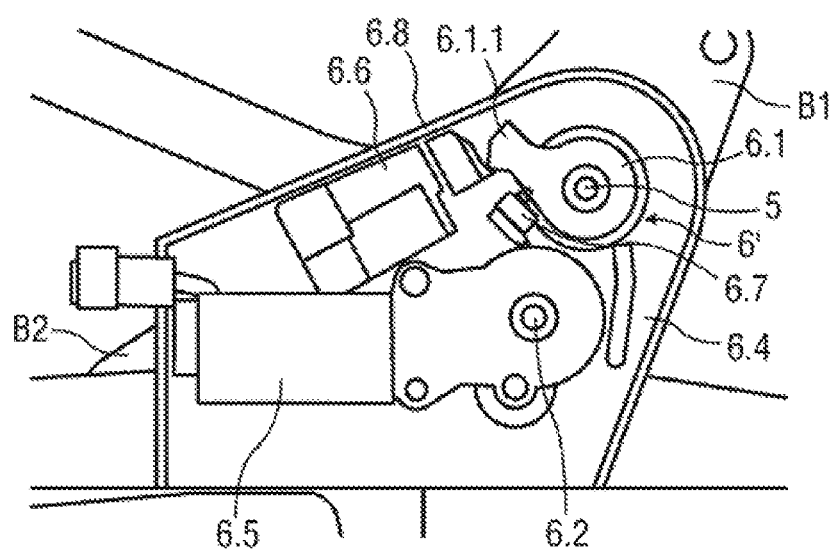
FIG. 7 is a schematic view showing an exemplary embodiment of an arrangement of an electric drive unit of a backrest adjuster according to FIG. 2 in a housing.

FIG. 7 schematically shows an exemplary embodiment of an arrangement of the electric drive unit 6' of the backrest adjustor 1 according to FIG. 2 in a housing, with an inner housing part 6.4 arranged on the fitting lower part B2 and with an outer housing part 6.8, which is illustrated transparently. The components of the electric drive unit 6' are arranged protected between said housing parts 6.4 and 6.8. The outer housing part 6.8 can be designed here in such a manner that said housing part serves as a fitting screen for the backrest adjuster 1 on the side with the rotary bearing.

While specific embodiments of the invention have been shown and described in detail to illustrate the application of the principles of the invention, it will be understood that the invention may be embodied otherwise without departing from such principles.

The invention claimed is:

1. An electrically operated backrest adjuster for a vehicle seat with a seat part and a backrest which is adjustable relative to the seat part, the backrest adjuster comprising:
   a fitting for adjusting inclination of the backrest;
   two fitting sides of which each comprises a fitting upper part fixed on the backrest, and a fitting lower part fixed on the seat part, and of which at least one of the two fitting sides comprises the fitting for adjusting the inclination of the backrest, wherein the fitting is arranged between the fitting upper part and the fitting lower part;
   a transmission rod, the fitting sides being coupled to each other by the transmission rod; and
   an electric drive unit on one of the fitting sides as a drive-side fitting side, said electric drive unit being arranged on an outside of the fitting lower part of the one fitting side and being coupled to the transmission rod for driving the transmission rod;
   an actuating unit with a lever element; and
   an actuator arranged on the fitting lower part of the drive-side fitting side, said actuator being operatively connected to the lever element, for unlocking or locking the fitting.

2. The electrically operated backrest adjuster as claimed in claim 1, wherein the fitting lower part of the drive-side fitting side is designed in such a manner that said fitting lower part forms at least part of a housing for the electric drive unit.

3. The electrically operated backrest adjuster as claimed in claim 1, further comprising a switching element, comprising a microswitch or a position indicator, arranged on the fitting lower part of the drive-side fitting side, said switching element being operatively connected to the lever element in order to determine a position thereof.

4. The electrically operated backrest adjuster as claimed in claim 1, wherein the electric drive unit comprises a driveshaft with a pinion which is in engagement with a stop element which is connected to the fitting upper part and the transmission rod in a rotationally fixed fashion.

5. The electrically operated backrest adjuster as claimed in claim 1, wherein one of the fitting lower parts is designed in such a manner that said one fitting lower part is fastened to a component, which is fixed on the floor, of the seat part and/or to a substructure in an interlocking, friction and/or an adhesion connection.

6. The electrically operated backrest adjuster as claimed in claim 1, wherein one of the fitting upper parts is designed in such a manner that said one fitting upper part is fastened to a frame structure or to a frame part of the backrest in an interlocking connection, a friction connection and/or an adhesion connection.

7. The electrically operated backrest adjuster as claimed in claim 1, configured as a premanufactured installation unit.

8. A vehicle seat comprising:
   a seat part;
   a backrest adjustable relative to the seat part; and
   an electrically operated backrest adjuster comprising:
   a fitting for adjusting an inclination of the backrest;
   two fitting sides of which each comprises a fitting upper part fixed on the backrest, and a fitting lower part fixed on the seat part, and of which at least one of the two fitting sides comprises the fitting for adjusting the inclination of the backrest, wherein the fitting is arranged between the fitting upper part and the fitting lower part;
   a transmission rod, the fitting sides being coupled to each other by the transmission rod;
   an electric drive unit on one of the fitting sides as a drive-side fitting side, said electric drive unit being arranged on an outside of the associated fitting lower part and being coupled to the transmission rod for driving the transmission rod;
   an actuating unit with a lever element; and
   an actuator arranged on the fitting lower part of the drive-side fitting side, said actuator being operatively connected to the lever element for unlocking or locking the fitting.

9. A vehicle seat as claimed in claim 8, wherein the fitting lower part of the drive-side fitting side is configured such that said fitting lower part forms at least part of a housing for the electric drive unit.

10. A vehicle seat as claimed in claim 8, wherein the backrest adjuster further comprises a switching element, comprising a microswitch or a position indicator, arranged on the fitting lower part of the drive-side fitting side, said switching element being operatively connected to the lever element in order to determine a position thereof.

11. A vehicle seat as claimed in claim 8, wherein the electric drive unit comprises a driveshaft with a pinion which is in engagement with a stop element which is connected to the fitting upper part and the transmission rod in a rotationally fixed fashion.

12. A vehicle seat as claimed in claim 8, wherein the respective fitting lower part is configured such that the fitting lower part is fastened to a component, which is fixed on the floor, of the seat part and/or to a substructure with an interlocking connection, a friction connection, bonding or an adhesion connection.

13. A vehicle seat as claimed in claim 8, wherein the respective fitting upper part is configured such that the fitting upper part is fastened to a frame structure or to a frame part of the backrest with an interlocking connection, a friction connection, or an adhesion connection.

14. A vehicle seat as claimed in claim 8, wherein the backrest adjuster is configured as a premanufactured installation unit.

15. A method for installing an electrically operated backrest adjuster comprising:
   a fitting for adjusting an inclination of the backrest;
   two fitting sides of which each comprises a fitting upper part fixed on the backrest, and a fitting lower part fixed on the seat part, and of which at least one of the two fitting sides comprises the fitting for adjusting the inclination of the backrest, wherein the fitting is arranged between the fitting upper part and the fitting lower part;
   a transmission rod, the fitting sides being coupled to each other by the transmission rod; and
   an electric drive unit on one of the fitting sides as a drive-side fitting side, said electric drive unit being arranged on an outside of the fitting lower part of the one fitting side and being coupled to the transmission rod for driving the transmission rod, the method comprising the steps of:

fitting together the two fitting upper parts and the transmission rod connecting same, placing and fastening the at least one fitting on an end of the transmission rod that projects out of one of the fitting upper parts, placing and rotatably arranging the fitting lower parts onto ends of the transmission rod which project out of the fittings, placing and fastening an actuating unit on an outside of the fitting lower part of one of the fitting sides, mounting a driveshaft with a pinion on said fitting lower part, mounting and fastening an electric drive unit on the outside of one of the fitting lower parts, in particular mounting and fastening associated components, such as a motor, an actuator, a switching element.

16. A method as claimed in claim 15, wherein one of the respective fitting lower parts is configured such that the one fitting lower part is fastened to a component, which is fixed on the floor, of the seat part and/or to a substructure with an interlocking connection, a friction connection or an adhesion connection.

17. A method as claimed in claim 15, wherein one of the respective fitting parts is configured such that the one fitting upper part is fastened to a frame structure or to a frame part of the backrest with an interlocking connection, a friction connection, or an adhesion connection.

18. A method as claimed in claim 15, wherein the backrest adjuster is configured as a premanufactured installation unit.

19. An electrically operated backrest adjuster for a vehicle seat with a seat part and a backrest which is adjustable relative to the seat part, the backrest adjuster comprising:
a fitting for adjusting inclination of the backrest;
two fitting sides of which each comprises a fitting upper part fixed on the backrest, and a fitting lower part fixed on the seat part, and of which a first of the fitting sides comprises the fitting for adjusting the inclination of the backrest, and of which a second of the fitting sides comprises a rotary bearing,
wherein the fitting and the rotary bearing are arranged between the fitting upper part and the fitting lower part of a respective one of the first and second fitting side;
a transmission rod, the first and second fitting sides being coupled to each other by the transmission rod;
the electric drive unit mounted on the rotary bearing on the second fitting side, said electric drive unit being arranged on an outside of the fitting lower part of the second fitting side, and being coupled to the transmission rod for driving the transmission rod; and
wherein components of the electric drive unit are arranged between an inner housing part, which is arranged outside of the fitting lower part of the second fitting side, and an outer housing part.

20. The electrically operated backrest adjuster as claimed in claim 19, wherein
the components of the electric drive unit include an actuating unit for unlocking or locking the fitting, a motor for driving the transmission rod, an actuator for unlocking or locking the fitting, and a switching element for determining the position of the actuating unit.

21. The electrically operated backrest adjuster as claimed in claim 19, wherein an actuator is arranged on the fitting lower part of the second fitting side, said actuator being operatively connected to a lever element of an actuating unit for unlocking or locking the fitting.

22. The electrically operated backrest adjuster as claimed in claim 21, wherein a switching element is arranged on the fitting lower part of the second fitting side, said switching element being operatively connected to the lever element in order to determine the position thereof.

23. The electrically operated backrest adjuster as claimed in claim 22, wherein the switching element is a microswitch or a position indicator.

24. A vehicle seat comprising:
a seat part;
a backrest adjustable relative to the seat part; and
an electrically operated backrest adjuster comprising:
a fitting for adjusting an inclination of the backrest;
two fitting sides of which each comprises a fitting upper part fixed on the backrest, and a fitting lower part fixed on the seat part, and of which a first of the two fitting sides comprises the fitting for adjusting the inclination of the backrest, a second of the fitting sides comprises a rotary bearing, the fitting and the rotary bearing being arranged between the fitting upper part and the fitting lower part of a respective one of the first and second fitting side;
a transmission rod, the fitting sides being coupled to each other by the transmission rod;
an electric drive unit mounted on the rotary bearing on the second fitting side, said electric drive unit being arranged on an outside of the fitting lower part of the second fitting side, and being coupled to the transmission rod for driving the transmission rod; and
wherein components of the electric drive unit are arranged between an inner housing part, which is arranged outside of the fitting lower part of the second fitting side, and an outer housing part.

* * * * *